United States Patent
Matsuoka

(10) Patent No.: US 12,438,416 B2
(45) Date of Patent: Oct. 7, 2025

(54) DRIVE UNIT WITH SELECTIVELY ENGAGEABLE TORQUE CONVERTER AND REDUCER

(71) Applicant: EXEDY Corporation, Neyagawa (JP)

(72) Inventor: Yoshihiro Matsuoka, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 265 days.

(21) Appl. No.: 18/176,622

(22) Filed: Mar. 1, 2023

(65) Prior Publication Data

US 2023/0327515 A1     Oct. 12, 2023

(30) Foreign Application Priority Data

Apr. 1, 2022   (JP) ................................. 2022-061732

(51) Int. Cl.
| | |
|---|---|
| H02K 7/116 | (2006.01) |
| H02K 7/00 | (2006.01) |
| H02K 7/108 | (2006.01) |

(52) U.S. Cl.
CPC ............ *H02K 7/116* (2013.01); *H02K 7/003* (2013.01); *H02K 7/108* (2013.01); *H02K 7/006* (2013.01)

(58) Field of Classification Search
CPC .......... H02K 7/003; H02K 7/10; H02K 7/108; H02K 7/116; H02K 7/006
See application file for complete search history.

(56) References Cited

U.S. PATENT DOCUMENTS

| | | | | |
|---|---|---|---|---|
| 7,967,122 B2* | 6/2011 | Friedmann | ............ | F16C 33/588 192/55.61 |
| 10,493,978 B2* | 12/2019 | Haupt | ................... | B60W 10/10 |
| 10,670,090 B2* | 6/2020 | Endo | ....................... | B60K 17/26 |
| 2004/0184205 A1* | 9/2004 | Ido | ........................ | H02K 7/108 361/23 |
| 2019/0301581 A1* | 10/2019 | Matsuoka | ............... | F16H 45/02 |
| 2019/0367127 A1* | 12/2019 | Noda | ........................ | F16H 1/20 |
| 2020/0136491 A1* | 4/2020 | Kim | ........................ | F16H 3/54 |
| 2020/0325972 A1* | 10/2020 | Matsuoka | ............... | F16H 41/30 |
| 2020/0361321 A1* | 11/2020 | Matsuoka | .......... | B60L 15/2081 |
| 2022/0055471 A1* | 2/2022 | Ideue | ..................... | B60K 6/387 |

(Continued)

FOREIGN PATENT DOCUMENTS

| | | | | |
|---|---|---|---|---|
| JP | 2017040336 A | * | 2/2017 | ............. F16D 41/06 |
| JP | 2020-172975 A | | 10/2020 | |

OTHER PUBLICATIONS

JP2017040336A translation (Year: 2017).*

*Primary Examiner* — Oluseye Iwarere
*Assistant Examiner* — Nicholas Lee Setzer
(74) *Attorney, Agent, or Firm* — United IP Counselors, LLC

(57) ABSTRACT

A drive unit includes an electric motor, a torque converter, a reducer, a first shaft, a second shaft, and a clutch. The torque converter amplifies a torque generated by the electric motor when the torque is directed in a first rotational direction. The reducer is configured to output the torque by reducing a speed of rotation of the electric motor. The first shaft transmits the torque from the electric motor to the torque converter. The second shaft transmits the torque from the torque converter to the reducer. The clutch is disposed in the interior of the reducer. The clutch allows or blocks transmission of the torque between the first shaft and the second shaft.

11 Claims, 3 Drawing Sheets

(56) References Cited

U.S. PATENT DOCUMENTS

2022/0072946 A1\* 3/2022 Kitada ................... H02K 7/075
2022/0399779 A1\* 12/2022 Matsuoka ................ B60K 1/00
2023/0010604 A1\* 1/2023 Ishikawa ................ H02K 5/203

\* cited by examiner

DRIVE UNIT WITH SELECTIVELY ENGAGEABLE TORQUE CONVERTER AND REDUCER

CROSS-REFERENCE TO RELATED APPLICATIONS

This application claims priority to Japanese Patent Application No. 2022-061732 filed Apr. 1, 2022. The entire contents of that application are incorporated by reference herein in their entirety.

TECHNICAL FIELD

The present invention relates to a drive unit.

BACKGROUND ART

There has been proposed a type of drive unit in which a torque converter is installed in order to amplify a torque of an electric motor. A drive unit, described in Japan Laid-open Patent Application Publication No. 2020-172975, is provided with a one-way clutch installed in the interior of a torque converter thereof in order to efficiently transmit a torque when an electric motor is reversely rotated to make a vehicle travel backward. The one-way clutch is configured to make a cover rotatable relative to a turbine in a forward rotational direction and make the cover rotate unitarily with the turbine in a reverse rotational direction.

In the drive unit described above, the one-way clutch is installed between the cover and the turbine in the torque converter; hence, this poses a drawback that the torque converter is made relatively complicated in structure and requires high manufacturing cost.

In view of this, it is an object of the present invention to provide a drive unit that can be easily manufactured.

BRIEF SUMMARY

A drive unit according to an aspect of the present invention includes an electric motor, a torque converter, a reducer, a first shaft, a second shaft, and a clutch. The torque converter is configured to amplify a torque generated by the electric motor when the torque is directed in a first rotational direction. The reducer is configured to output the torque by reducing a speed of rotation of the electric motor. The first shaft is configured to transmit the torque from the electric motor to the torque converter. The second shaft is configured to transmit the torque from the torque converter to the reducer. The clutch is disposed in an interior of the reducer. The clutch is configured to allow or block transmission of the torque between the first shaft and the second shaft.

According to the configuration, when the electric motor is rotated in the first rotational direction, the torque amplified by the torque converter is outputted to an output unit. By contrast, when the torque outputted from the electric motor is directed in a second rotational direction, transmission of the torque is made from the first shaft to the second shaft through the clutch. In other words, the torque directed in the second rotational direction is not amplified by the torque converter and is thus outputted to the output unit without through the torque converter. Besides, the clutch is disposed in the interior of the reducer and is configured to allow or block transmission of the torque between the first shaft and the second shaft; hence, the drive unit can be easily manufactured.

Preferably, the clutch is configured to allow transmission of the torque generated by the electric motor from the first shaft to the second shaft when the torque is directed in a second rotational direction. By contrast, the clutch is configured to block transmission of the torque generated by the electric motor from the first shaft to the second shaft when the torque is directed in the first rotational direction.

Preferably, the second shaft has a cylindrical shape. The first shaft axially extends through an interior of the second shaft. The clutch is disposed radially between the first shaft and the second shaft.

Preferably, the first shaft includes an attachment portion and an extending portion. The attachment portion causes the clutch to be attached thereto. The extending portion extends from the attachment portion toward a distal end of the first shaft. The extending portion is lesser in diameter than the attachment portion.

Preferably, the second shaft includes a small diameter portion and a large diameter portion. The small diameter portion extends through an interior of the torque converter. The large diameter portion is greater in inner and outer diameters than the small diameter portion. The large diameter portion is disposed radially outside the attachment portion. The clutch is disposed between the large diameter portion and the attachment portion.

Preferably, the reducer is disposed axially between the electric motor and the torque converter.

Preferably, the reducer includes a first drive gear. The first drive gear is configured to be unitarily rotated with the second shaft. The first drive gear is disposed to overlap with the clutch in a radial view.

Preferably, the reducer includes a first driven gear and a second drive gear. The first driven gear is meshed with the first drive gear. The second drive gear is configured to be unitarily rotated with the first driven gear. The first driven gear is disposed axially between the second drive gear and the torque converter.

Overall, according to the present invention, the drive unit can be easily manufactured.

DETAILED DESCRIPTION

Figure 1:
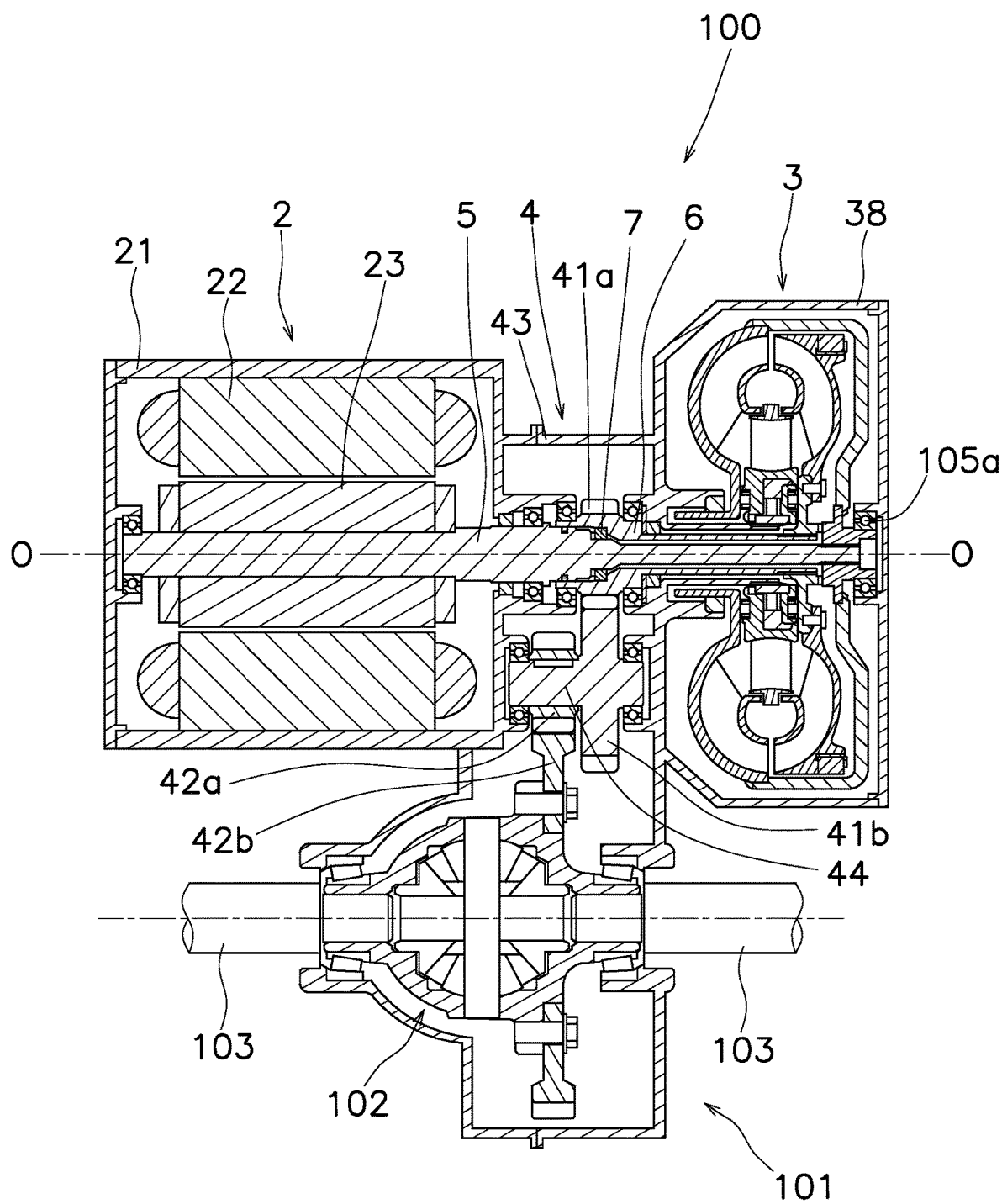
FIG. 1 is a cross-sectional view of a drive unit.

A preferred embodiment of a drive unit will be hereinafter explained with reference to drawings. FIG. 1 is a cross-sectional view of the drive unit according to the present preferred embodiment. It should be noted that in the following explanation, the term "axial direction" refers to an extending direction of a rotational axis O of an electric motor. On the other hand, the term "circumferential direction" refers to a circumferential direction of an imaginary circle about the rotational axis O, whereas the term "radial direction" refers to a radial direction of the imaginary circle about the rotational axis O. Besides, the term "first rotational rotation" refers to a direction in which each of constituent members is rotated when a vehicle travels forward, whereas the term "second rotational direction" refers to a direction in which each of the constituent members is rotated when the vehicle travels backward.

[Drive Unit 100]

As shown in FIG. 1, a drive unit 100 includes an electric motor 2, a torque converter 3, a reducer 4, a first shaft 5, a second shaft 6, and a clutch 7. The drive unit 100 is installed in, for instance, an electric car. The drive unit 100 is configured to drive an output unit 101. It should be noted that the output unit 101 includes a differential gear 102, a pair of drive shafts 103, and drive wheels (not shown in the drawings). It should be noted that the output unit 101 can include only the drive wheels.

<Electric Motor 2>

The electric motor 2 is a drive source of the drive unit 100. When the electric motor 2 is rotated in the first rotational direction, the vehicle is enabled to travel forward. Contrarily, when the electric motor 2 is rotated in the second rotational direction, the vehicle is enabled to travel backward. The electric motor 2 includes a motor casing 21, a stator 22, and a rotor 23. The motor casing 21 is non-rotatable, while being fixed to a body frame of the vehicle or so forth.

The stator 22 is fixed to the inner peripheral surface of the motor casing 21. The stator 22 is non-rotatable. The rotor 23 is rotated about the rotational axis O. The rotor 23 is disposed radially inside the stator 22. In other words, the electric motor 2 is of a so-called inner rotor type.

<Torque Converter 3>

The torque converter 3 is configured to amplify a torque generated by the electric motor 2 when the torque is directed in the first rotational direction. It should be noted that the torque converter 3 does not amplify the torque generated by the electric motor 2 when the torque is directed in the second rotational direction. The rotational axis O of the torque converter 3 is substantially matched with that of the electric motor 2. The torque converter 3 is disposed axially apart from the electric motor 2 at an interval. The reducer 4 is disposed between the torque converter 3 and the electric motor 2. It should be noted that the torque converter 3 is accommodated in the interior of a torque converter casing 38.

Figure 2:
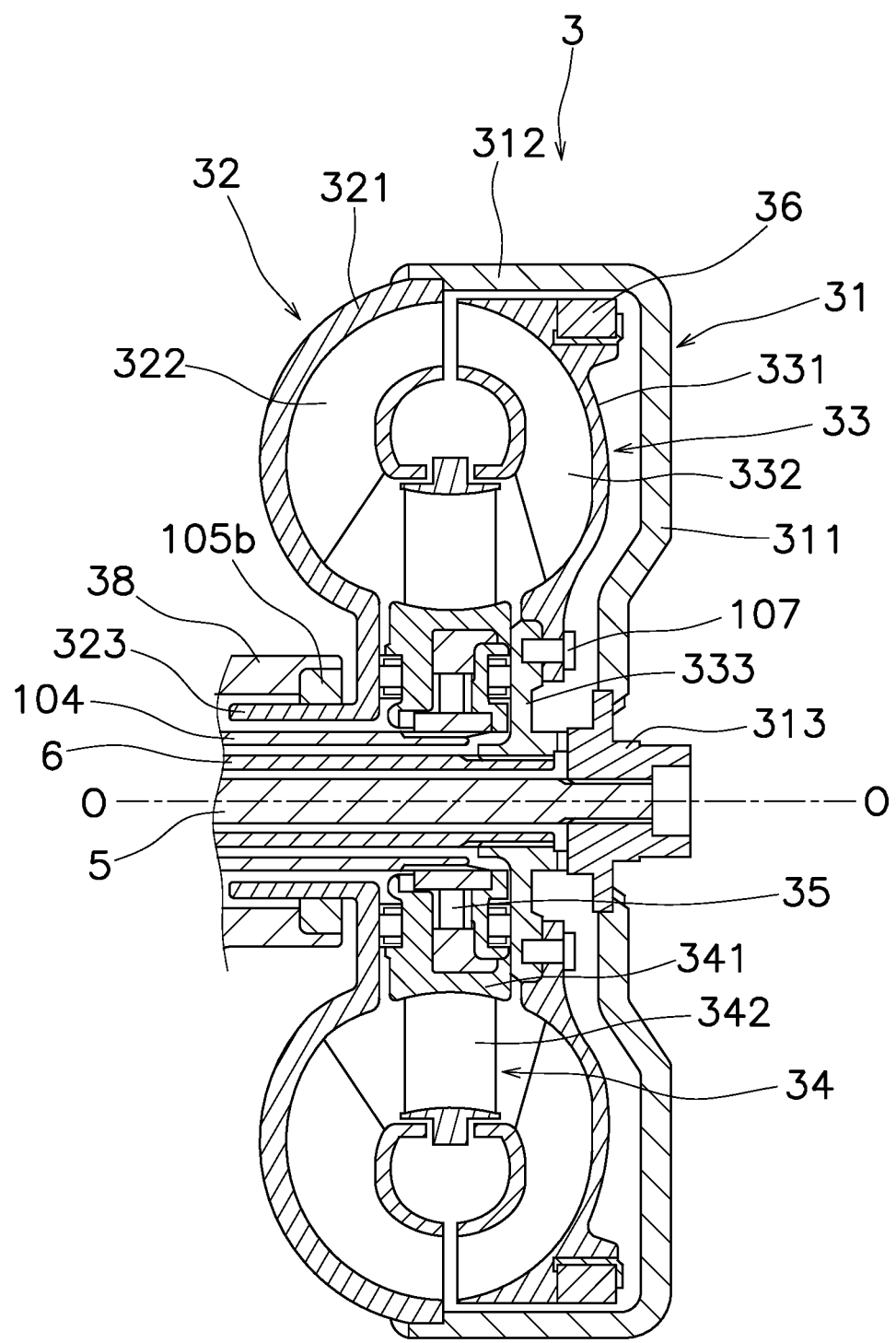
FIG. 2 is a cross-sectional view of a torque converter.

As shown in FIG. 2, the torque converter 3 includes a cover 31, an impeller 32, a turbine 33, a stator 34, and a one-way clutch 35. Besides, the torque converter 3 further includes a centrifugal clutch 36.

The torque converter 3 is disposed such that the impeller 32 faces the electric motor 2 (the left side in FIG. 2), whereas the cover 31 faces opposite to the electric motor 2 (the right side in FIG. 2). Hydraulic fluid is supplied to the interior of the torque converter 3. The hydraulic fluid is, for instance, hydraulic oil.

The cover 31 is a component to which the torque, outputted from the electric motor 2, is transmitted through the first shaft 5. The cover 31 is rotated by the torque transmitted thereto from the electric motor 2. The cover 31 is fixed to the first shaft 5 extending from the electric motor 2. For example, the cover 31 includes a spline hole to which the first shaft 5 is spline-coupled. Because of this, the cover 31 is unitarily rotated with the first shaft 5.

The cover 31 is disposed to cover the turbine 33. The cover 31 includes a disc portion 311, a cylindrical portion 312, and a cover hub 313. The disc portion 311 includes an opening in the middle thereof. The cylindrical portion 312 extends from the outer peripheral end of the disc portion 311 toward the electric motor 2. The disc portion 311 and the cylindrical portion 312 are integrated with each other as a single member.

The cover hub 313 is fixed to the inner peripheral end of the disc portion 311. In the present preferred embodiment, the cover hub 313 is provided as a member separated from the disc portion 311; however, the cover hub 313 can be integrated with the disc portion 311 as a single member.

The cover hub 313 has a cylindrical shape and includes the spline hole. The first shaft 5 is spline-coupled to the cover hub 313. The cover hub 313 is rotatably supported by the torque converter casing 38 through a bearing member 105a (see FIG. 1).

The impeller 32 is unitarily rotated with the cover 31. The impeller 32 is fixed to the cover 31. The impeller 32 includes an impeller shell 321, a plurality of impeller blades 322, and an impeller hub 323.

The impeller shell 321 is fixed to the cover 31. The plural impeller blades 322 are attached to the inner surface of the impeller shell 321.

The impeller hub 323 is attached to the inner peripheral end of the impeller shell 321. It should be noted that in the present preferred embodiment, the impeller hub 323 is integrated with the impeller shell 321 as a single member, but alternatively, can be provided as a member separated from the impeller shell 321.

The impeller hub 323 is rotatably supported by the torque converter casing 38 through a bearing member 105b. A stationary shaft 104 axially extends through the interior of the impeller hub 323. It should be noted that the stationary shaft 104 has a cylindrical shape and the second shaft 6 axially extends through the interior of the stationary shaft 104. Besides, the stationary shaft 104 extends from, for instance, a reducer casing 43 or the torque converter casing 38. The stationary shaft 104 is non-rotatable.

The turbine 33 is opposed to the impeller 32. When described in detail, the turbine 33 is axially opposed to the impeller 32. The turbine 33 is a component to which the torque is transmitted from the impeller 32 through the hydraulic fluid.

The turbine 33 includes a turbine shell 331, a plurality of turbine blades 332, and a turbine hub 333. The plural turbine blades 332 are fixed to the inner surface of the turbine shell 331.

The turbine hub 333 is fixed to the inner peripheral end of the turbine shell 331. For example, the turbine hub 333 is fixed to the turbine shell 331 by rivets 107. In the present preferred embodiment, the turbine hub 333 is provided as a member separated from the turbine shell 331; however, the turbine hub 333 can be integrated with the turbine shell 331 as a single member.

The second shaft 6 is attached to the turbine hub 333. When described in detail, the second shaft 6 is spline-coupled to the turbine hub 333. The turbine hub 333 is unitarily rotated with the second shaft 6.

The stator 34 is configured to regulate the flow of the hydraulic fluid returning from the turbine 33 to the impeller 32. The stator 34 is rotatable about the rotational axis O. For example, the stator 34 is supported by the stationary shaft 104 through the one-way clutch 35. The stator 34 is disposed axially between the impeller 32 and the turbine 33.

The stator 34 includes a stator carrier 341 having a disc shape and a plurality of stator blades 342 attached to the outer peripheral surface of the stator carrier 341.

The centrifugal clutch 36 is attached to the turbine 33. The centrifugal clutch 36 is unitarily rotated with the turbine 33. The centrifugal clutch 36 is configured to couple the cover 31 and the turbine 33 to each other by a centrifugal force generated in rotation of the turbine 33. When described in detail, the centrifugal clutch 36 is configured to transmit the torque from the cover 31 to the turbine 33 when the rotational speed of the turbine 33 becomes greater than or equal to a predetermined value.

The centrifugal clutch 36 is disposed to be radially movable. It should be noted that the centrifugal clutch 36 is disposed to be circumferentially immovable. Because of this, the centrifugal clutch 36 is rotated together with the turbine 33 and is moved radially outward by the centrifugal force.

When the rotational speed of the turbine 33 becomes greater than or equal to the predetermined value, the centrifugal clutch 36 is moved radially outward and is engaged by friction with the inner peripheral surface of the cylindrical portion 312 of the cover 31. As a result, the centrifugal clutch 36 is turned to an on state; hence, the torque inputted to the cover 31 is transmitted therefrom to the turbine 33 through the centrifugal clutch 36. It should be noted that even when the centrifugal clutch 36 is turned to the on state, the hydraulic fluid is flowable through the centrifugal clutch 36.

When the rotational speed of the turbine 33 becomes less than the predetermined value, the centrifugal clutch 36 is moved radially inward, whereby the centrifugal clutch 36 and the inner peripheral surface of the cylindrical portion 312 of the cover 31, engaged by friction, are disengaged from each other. As a result, the centrifugal clutch 36 is turned to an off state; hence, the torque inputted to the cover 31 is not transmitted therefrom to the turbine 33 through the centrifugal clutch 36. In other words, the torque inputted to the cover 31 is transmitted therefrom to the impeller 32 and is then transmitted to the turbine 33 through the hydraulic fluid.

<Reducer 4>

As shown in FIG. 1, the reducer 4 is disposed axially between the electric motor 2 and the torque converter 3. The reducer 4 is configured to output the torque by reducing the speed of rotation of the electric motor 2. When described in detail, the reducer 4 includes a first drive gear 41a, a first driven gear 41b, a second drive gear 42a, and a second driven gear 42b. Besides, the reducer 4 includes the reducer casing 43 in which the respective gears are accommodated.

The first drive gear 41a is configured to be unitarily rotated with the second shaft 6. It should be noted that the first drive gear 41a is integrated with the second shaft 6 as a single member and thus composes part of the second shaft 6. It should be noted that the first drive gear 41a can be provided as a member separated from the second shaft 6 and can be fixed to the second shaft 6. The first drive gear 41a is disposed on a distal end portion of the second shaft 6.

The first driven gear 41b is disposed to be meshed with the first drive gear 41a. The first driven gear 41b is supported by a support shaft 44. The first driven gear 41b is configured to be unitarily rotated with the support shaft 44. It should be noted that the first driven gear 41b is integrated with the support shaft 44 as a single member. The first driven gear 41b is greater in number of teeth than the first drive gear 41a.

The second drive gear 42a is configured to be unitarily rotated with the first driven gear 41b. When described in detail, the second drive gear 42a is configured to be unitarily rotated with the support shaft 44. The first driven gear 41b is disposed axially between the second drive gear 42a and the torque converter 3.

The second driven gear 42b is configured to be meshed with the second drive gear 42a. The second driven gear 42b is greater in number of teeth than the second drive gear 42a. It should be noted that the second driven gear 42b is a ring gear of the differential gear 102.

The first drive gear 41a is disposed to overlap with the clutch 7 in a radial view. It should be noted that the first driven gear 41b is also disposed to overlap with the clutch 7 in the radial view.

<First Shaft 5>

The first shaft 5 is disposed to be rotatable. It should be noted that the rotational axis of the first shaft 5 is substantially matched with that of the electric motor 2 and that of the torque converter 3.

The first shaft 5 is configured to transmit the torque, inputted thereto from the electric motor 2, to the torque converter 3. When described in detail, the first shaft 5 axially extends from the electric motor 2 to the torque converter 3. The first shaft 5 is unitarily rotated with the rotor 23 of the electric motor 2. Besides, the first shaft 5 is attached at a distal end portion thereof to the cover 31 of the torque converter 3. Because of this, when the rotor 23 of the electric motor 2 is rotated, the cover 31 is also rotated through the first shaft 5.

Figure 3:
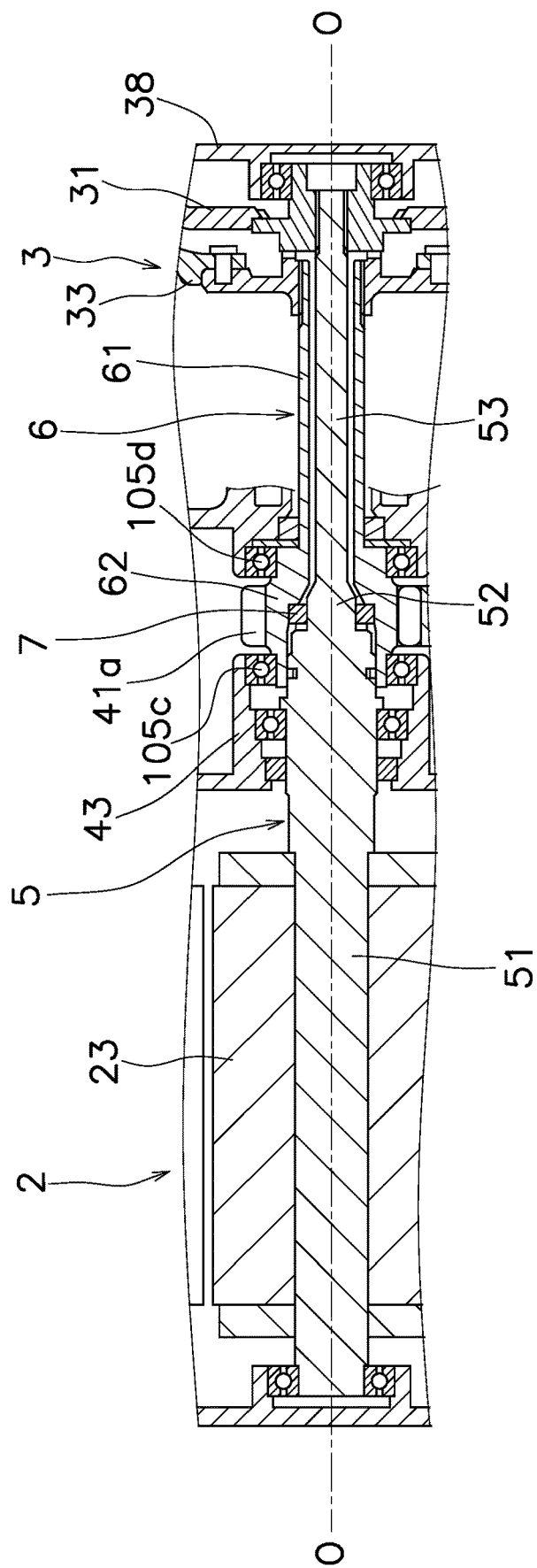
FIG. 3 is an enlarged cross-sectional view of the drive unit.

FIG. 3 is an enlarged cross-sectional view of the drive unit. It should be noted that FIG. 3 omits illustration of part of constituent members for easy understanding of the drawing. As shown in FIG. 3, the first shaft 5 axially extends through the interior of the second shaft 6. The first shaft 5 is solid. The first shaft 5 includes a base end portion 51, an attachment portion 52, and an extending portion 53.

The base end portion 51 is a portion attached to the electric motor 2. The base end portion 51 extends through the interior of the electric motor 2. Besides, the base end portion 51 extends in part in the interior of the reducer 4.

The attachment portion 52 is a portion that causes the clutch 7 to be attached thereto. The attachment portion 52 is a portion disposed between the base end portion 51 and the extending portion 53. The attachment portion 52 is disposed in the interior of the reducer 4. The attachment portion 52 is lesser in outer diameter than the base end portion 51. Because of this, a step portion is formed in a boundary between the base end portion 51 and the attachment portion 52. The step portion restricts axial movement of the clutch 7.

The extending portion 53 is a portion extending from the attachment portion 52 toward the distal end (the right end in FIG. 3) of the first shaft 5. In other words, the extending portion 53 is a portion located closer to the torque converter 3 than the attachment portion 52. The extending portion 53 extends through the interior of the torque converter 3. The cover 31 is attached to a distal end portion of the extending portion 53. The extending portion 53 is lesser in diameter than the attachment portion 52.

<Second Shaft 6>

The second shaft 6 is disposed to be rotatable. The rotational axis of the second shaft 6 is substantially matched with that of the electric motor 2 and that of the torque converter 3. Besides, the second shaft 6 is disposed coaxial to the first shaft 5. The second shaft 6 is rotatable relative to the first shaft 5. The second shaft 6 has a cylindrical shape. The first shaft 5 extends through the interior of the second shaft 6.

The second shaft 6 is configured to transmit the torque, inputted thereto from the torque converter 3, to the reducer 4. When described in detail, the second shaft 6 axially extends from the torque converter 3 toward the electric motor 2. The second shaft 6 is attached to the turbine 33 of the torque converter 3 and is unitarily rotated therewith. Besides, the second shaft 6 is provided with the first drive gear 41a of the reducer 4 on the distal end portion thereof (a left end portion in FIG. 3).

The second shaft 6 includes a small diameter portion 61 and a large diameter portion 62. The small diameter portion 61 extends through the interior of the torque converter 3. The turbine 33 is attached to a base end portion (a right end portion in FIG. 3) of the small diameter portion 61.

The large diameter portion 62 is disposed axially closer to the electric motor 2 than the small diameter portion 61. The large diameter portion 62 is greater in outer diameter than the small diameter portion 61. Besides, the large diameter portion 62 is greater in inner diameter than the small diameter portion 61. Because of this, a step portion is provided in a boundary between the inner peripheral surface of the large diameter portion 62 and that of the small diameter portion 61. The step portion restricts axial movement of the clutch 7.

The large diameter portion 62 extends in the interior of the reducer 4. The large diameter portion 62 is provided with the first drive gear 41a on the outer peripheral surface thereof.

The large diameter portion 62 is disposed radially outside the attachment portion 52. The large diameter portion 62 and the attachment portion 52 are disposed radially apart from each other at an interval. The clutch 7 is disposed radially between the large diameter portion 62 and the attachment portion 52. In other words, the large diameter portion 62, the clutch 7, and the attachment portion 52 overlap in the radial view.

A distal end portion of the large diameter portion 62 (the left end portion in FIG. 3) is disposed radially outside the base end portion 51. In other words, the distal end portion of the large diameter portion 62 and the base end portion 51 overlap in the radial view. The large diameter portion 62 is rotatably supported at the distal end portion thereof by the reducer casing 43 through a bearing 105c. It should be noted that in the present preferred embodiment, the distal end portion of the large diameter portion 62 contacts with the base end portion 51 but can be disposed apart from the base end portion 51 at an interval.

<Clutch 7>

The clutch 7 is disposed in the interior of the reducer 4. When described in detail, the clutch 7 is disposed radially between the attachment portion 52 of the first shaft 5 and the large diameter portion 62 of the second shaft 6. Besides, the clutch 7 is disposed axially between the pair of bearing members 105c and 105d.

The clutch 7 is configured to allow or block transmission of the torque between the first shaft 5 and the second shaft 6. When described in detail, the clutch 7 is configured to block transmission of the torque outputted from the electric motor 2 from the first shaft 5 to the second shaft 6 when the torque is directed in the first rotational direction. In other words, when the electric motor 2 is rotated in the first rotational direction so as to make the vehicle travel forward, the clutch 7 does not transmit the torque directed in the first rotational direction from the first shaft 5 to the second shaft 6. Because of this, when the electric motor 2 is rotated in the first rotational direction, the first and second shafts 5 and 6 are made rotatable relative to each other. Then, the torque, outputted from the electric motor 2 so as to be directed in the first rotational direction, is sequentially transmitted to the first shaft 5, the torque converter 3, the second shaft 6, and the reducer 4 in this order. Because of this, transmission of the torque directed in the first rotational direction is made through the torque converter 3 in which the torque is amplified in magnitude.

By contrast, the clutch 7 is configured to transmit the torque, outputted from the electric motor 2, from the first shaft 5 to the second shaft 6, when the torque is directed in the second rotational direction. In other words, when the electric motor 2 is rotated in the second rotational direction so as to make the vehicle travel backward, the clutch 7 transmits the torque directed in the second rotational direction from the first shaft 5 to the second shaft 6. Because of this, when the electric motor 2 is rotated in the second rotational direction, the first and second shafts 5 and 6 are unitarily rotated. In other words, the torque, outputted from the electric motor 2 so as to be directed in the second rotational direction, is sequentially transmitted to the first shaft 5, the clutch 7, the second shaft 6, and the reducer 4 in this order. Thus, transmission of the torque directed in the second rotational direction is made without through the torque converter 3.

For example, a one-way clutch can be provided as the clutch 7 functioning as described above.

Modifications

One preferred embodiment of the present invention has been explained above. However, the present invention is not limited to the above, and a variety of changes can be made without departing from the gist of the present invention.

(a) In the preferred embodiment described above, the reducer 4 cannot change the speed of rotation; however, the configuration of the reducer 4 is not limited to this. For example, the reducer 4 can be configured to be capable of changing the speed of rotation. In other words, a transmission can be provided as the reducer 4.

(b) In the preferred embodiment described above, the clutch 7 takes the form of the one-way clutch; however, the configuration of the clutch 7 is not limited to this. For example, the clutch 7 can be configured to be electronically controlled.

(c) In the preferred embodiment described above, the reducer 4 is disposed axially between the electric motor 2 and the torque converter 3; however, the positional relation among the electric motor 2, the torque converter 3, and the reducer 4 is not limited to the above. For example, the torque converter 3 can be disposed axially between the electric motor 2 and the reducer 4.

REFERENCE SIGNS LIST

2: Electric motor
3: Torque converter
4: Reducer
41a: First drive gear
41b: First driven gear
42a: Second drive gear
5: First shaft
52: Attachment portion
53: Extending portion
6: Second shaft
61: Small diameter portion
62: Large diameter portion
7: Clutch
100: Drive unit

What is claimed is:
1. A drive unit comprising:
an electric motor;
a torque converter configured to amplify a torque generated by the electric motor when the torque is directed in a first rotational direction;
a reducer configured to output the torque by reducing a speed of rotation of the electric motor;

a first shaft configured to transmit the torque from the electric motor to the torque converter;
a second shaft configured to transmit the torque from the torque converter to the reducer; and
a clutch disposed in an interior of the reducer, the clutch configured to allow or block transmission of the torque between the first shaft and the second shaft;
wherein the second shaft has a cylindrical shape,
the first shaft axially extends through an interior of the second shaft,
the clutch is disposed radially between the first shaft and the second shaft,
the first shaft includes an extending portion and an attachment portion with an outer surface that is in contact with the clutch, the attachment portion causing the clutch to be attached thereto, the extending portion extending from and beyond the attachment portion and through an interior of the torque converter toward a distal end of the first shaft in an axial direction, and
the extending portion is smaller in diameter than the attachment portion.

2. The drive unit according to claim 1, wherein
the clutch is further configured to
allow transmission of the torque generated by the electric motor from the first shaft to the second shaft when the torque is directed in a second rotational direction, and
block transmission of the torque generated by the electric motor from the first shaft to the second shaft when the torque is directed in the first rotational direction.

3. The drive unit according to claim 1, wherein
the second shaft includes a small diameter portion and a large diameter portion, the small diameter portion extending through an interior of the torque converter, the large diameter portion greater in inner and outer diameters than the small diameter portion,
the large diameter portion is disposed radially outside the attachment portion, and
the clutch is disposed between the large diameter portion and the attachment portion.

4. The drive unit according to claim 1, wherein the reducer is disposed axially between the electric motor and the torque converter.

5. The drive unit according to claim 1, wherein
the reducer includes a first drive gear configured to be unitarily rotated with the second shaft, and
the first drive gear is disposed to overlap with the clutch in a radial view.

6. The drive unit according to claim 5, wherein
the reducer includes a first driven gear and a second drive gear, the first driven gear meshed with the first drive gear, the second drive gear configured to be unitarily rotated with the first driven gear, and
the first driven gear is disposed axially between the second drive gear and the torque converter.

7. A drive unit comprising:
an electric motor;
a torque converter having a cover, an impeller, a turbine, a stator, and a one-way clutch, and configured to amplify a torque generated by the electric motor when the torque is directed in a first rotational direction;
a reducer configured to output the torque by reducing a speed of rotation of the electric motor;
a first shaft configured to transmit the torque from the electric motor to the torque converter, the first shaft including an extending portion and an attachment portion with an outer surface, the extending portion being smaller in diameter than the attachment portion;
a second shaft having a cylindrical shaft to transmit the torque from the torque converter to the reducer; and
a clutch disposed in an interior of the reducer radially between the first and second shafts, the clutch contacting the outer surface of the first shaft, the clutch configured to allow or block transmission of the torque between the first shaft and the second shaft,
the second shaft axially extending from the cover to the clutch, the first shaft extending through an interior of the second shaft, and the extending portion axially extending from the attachment portion to the cover.

8. The drive unit according to claim 7, wherein
the second shaft includes a small diameter portion and a large diameter portion, the small diameter portion extending through an interior of the torque converter, the large diameter portion greater in inner and outer diameters than the small diameter portion,
the large diameter portion is disposed radially outside the attachment portion, and
the clutch is disposed between the large diameter portion and the attachment portion.

9. The drive unit according to claim 7, wherein the reducer is disposed axially between the electric motor and the torque converter.

10. The drive unit according to claim 7, wherein
the reducer includes a first drive gear configured to be unitarily rotated with the second shaft, and
the first drive gear is disposed to overlap with the clutch in a radial view.

11. The drive unit according to claim 10, wherein
the reducer includes a first driven gear and a second drive gear, the first driven gear meshed with the first drive gear, the second drive gear configured to be unitarily rotated with the first driven gear, and
the first driven gear is disposed axially between the second drive gear and the torque converter.

* * * * *